United States Patent [19]

Parkinson

[11] Patent Number: 4,663,967
[45] Date of Patent: May 12, 1987

[54] AIR FLOW SYSTEM BYPASSING A BALANCE IN A MODEL AIRPLANE BEING TESTED IN A WIND TUNNEL

[75] Inventor: C. Harry Parkinson, Poquoson, Va.

[73] Assignee: DEI-East Inc., Newport News, Va.

[21] Appl. No.: 744,687

[22] Filed: Jun. 14, 1985

[51] Int. Cl.⁴ .............................................. G01M 9/00
[52] U.S. Cl. ....................................................... 73/147
[58] Field of Search ........................................... 73/147

[56] References Cited

U.S. PATENT DOCUMENTS

| | | | |
|---|---|---|---|
| 3,019,643 | 2/1962 | Curry | 73/147 |
| 3,159,027 | 12/1964 | Curry | 73/147 |
| 3,233,452 | 2/1966 | Jones | 73/147 |
| 3,447,369 | 6/1969 | Horanoff | 73/147 |
| 3,455,155 | 7/1969 | Greenberg et al. | 73/147 |
| 3,587,306 | 6/1971 | Bryan | 73/147 |
| 3,878,713 | 4/1975 | Mole | 73/147 |
| 4,074,567 | 2/1978 | Horanoff | 73/147 |

FOREIGN PATENT DOCUMENTS 649970  2/1979  U.S.S.R. .................................. 73/147

*Primary Examiner*—Donald O. Woodiel
*Attorney, Agent, or Firm*—Joseph Scafetta, Jr.

[57] ABSTRACT

A model airplane for testing inside a wind tunnel has a fuselage and is mounted on a sting. A balance or force transducer is mounted on a forward end of the sting inside the fuselage of the model airplane and is of the strain gauge type for measuring forces acting on the model airplane. A plenum chamber for receiving air is mounted forwardly of the balance inside of the fuselage of the model airplane. At least one air feed line extends from the sting to the plenum chamber and bypasses or bridges over the balance. An external air source feeds air from the sting through the air feed line to the plenum chamber. Inside the plenum chamber, there is an externally pressurized bellow assembly having an internal cavity at a pressure equal to the static pressure existing in the fuselage of the model airplane. A fitting at the end of the bellow assembly allows air to enter the plenum chamber so that such below assembly is externally pressurized. Thus, by this arrangement, negligible force interactions from the air flowing in the sting, the air feed line, and the plenum chamber are transferred to the balance for measuring forces acting on the model airplane. To aid further in avoiding force interactions on the balance, a flexured bellow element is arranged in each air feed line so that undesirable torsion, pitch, and other forces are absorbed thereby and are prevented from being transferred to the balance.

20 Claims, 5 Drawing Figures

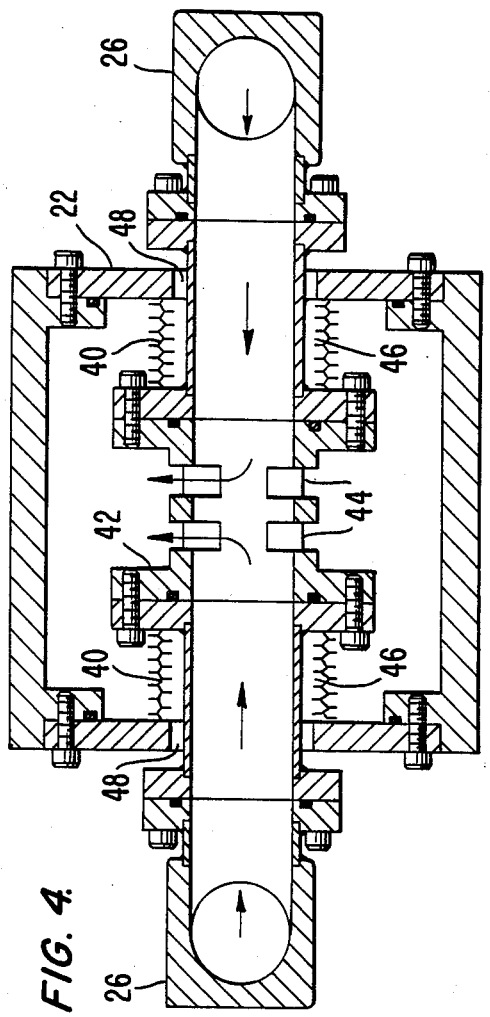
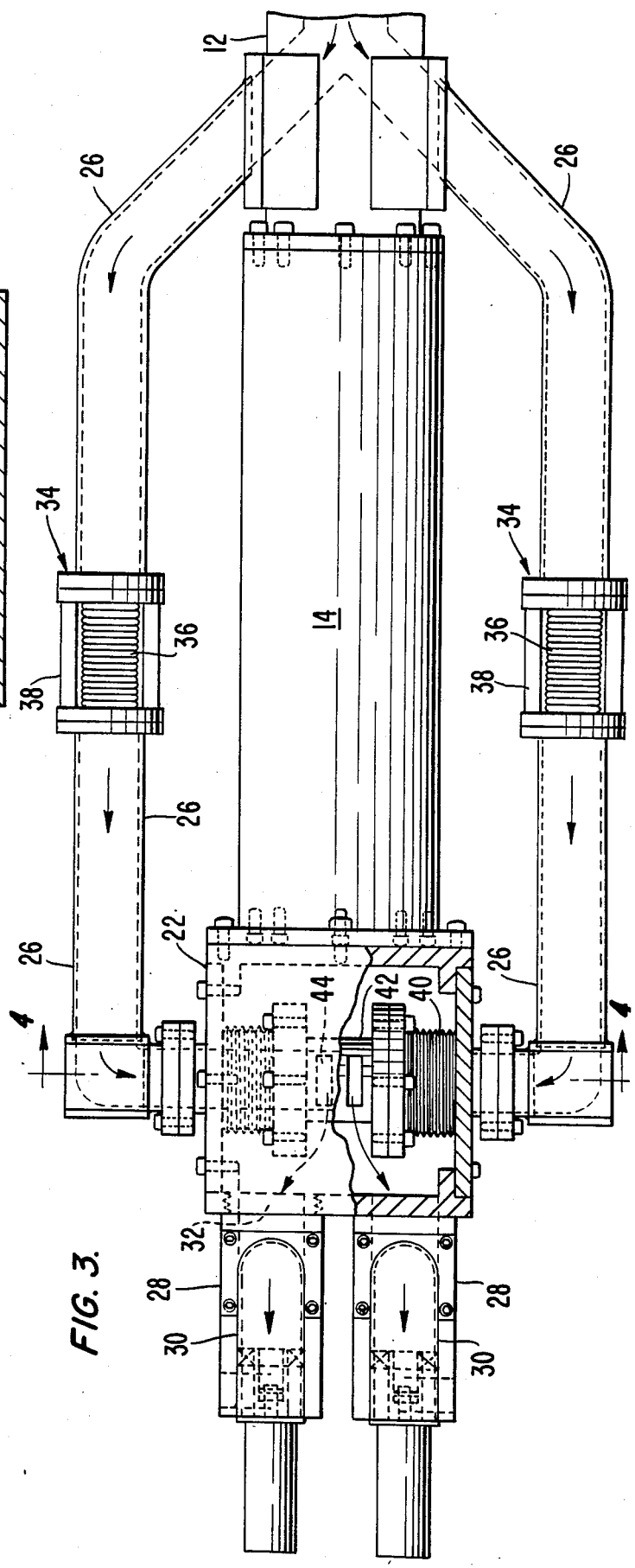
FIG. 4.
FIG. 3.

AIR FLOW SYSTEM BYPASSING A BALANCE IN A MODEL AIRPLANE BEING TESTED IN A WIND TUNNEL

BACKGROUND OF THE INVENTION

1. Field of the Invention

This invention relates generally to a wind tunnel for aerodynamic wing study and, in particular, to an air flow system which bypasses or bridges over a balance or force transducer in a model airplane being tested.

2. Description of the Prior Art

Many of the forces and moments to which an aircraft is subjected by the air flow cannot be accurately determined by purely theoretical calculations. The aircraft designer must, therefore, have recourse to experimental aerodynamics, which from the earliest days has contributed much to the progress made in aeronautical science.

One of the most important experimental aids is the wind tunnel, a device whereby the reactions of a carefully controlled airstream on scale models of airplanes or their component parts can be studied. The first condition that a model for testing in the wind tunnel must satisfy is that of geometric similarity with a full-scale prototype. In addition, certain other important conditions relating to flow conditions and velocity must be satisfied (e.g., Reynolds number; mach number; etc.) to enable valid measurements to be performed on the model. The Reynolds number is a correction factor applied to the analysis of the flow around the model. It corrects for the scale effect resulting from the difference in size between the model and the prototype.

When the fluid flow around the model is the same as that around the prototype, there is dynamic similarity. For complete similarity between the full-scale airplane and a model, e.g., one-tenth its linear size, the air velocity in the wind tunnel would have to be ten times as high as the speed for which the airplane is to be designed. For high-speed aircraft, this would require impracticably high wind velocities in the tunnel and impracticably strong models to withstand the high pressures associated with such velocities. For these reasons, the tests are usually made on models at Reynolds numbers well below those for the full-scale conditions.

In the interpretation of the results, due allowance is made for this difference in dynamic conditions. Various models and devices are employed for performing the measurements of the forces, moments, torques, and pressures to which the models, attached to special balances or rigidly supported, are subjected in the wind tunnel.

With the increasing demand for full configuration wind tunnel data, scale models of aircraft now also require the simulation of engine propulsion. The more popular methods for engine simulation use compressed air. However, it is a problem in the prior art to use an air feed line that will have little or no effect on the accuracy of the force transducer.

A model airplane in a wind tunnel is usually mounted on a support strut of some kind, such as a sting, which also acts as the ground side or non-matrix part of the force transducer. The model airplane itself is mounted on the so-called live side or matrix part of the force transducer.

In most conventional wind tunnels, a balance is mounted inside the fuselage of the model airplane. The balance is a force-measuring transducer of the strain gauge type positioned in front of the sting. The transducer is a device that is actuated by power from one system and supplies power usually in another form to a second system.

In the prior art, internally pressurized bellows are positioned at the front of the balance. This arrangement has been found to cause tremendous force interactions which require corrections to data measured during the course of testing the model airplane in the wind tunnel.

Examples of such wind tunnel balances of the strain gauge type in which internally pressurized bellows are used are the prior art arrangements shown in U.S.S.R. Pat. No. 649,970 to Vitushkin et al., U.S. Pat. No. 4,074,567 to Horanoff, U.S. Pat. No. 3,878,713 to Mole, U.S. Pat. No. 3,233,452 to Jones, U.S. Pat. No. 3,159,027 to Curry, and U.S. Pat. No. 3,019,643 also to Curry.

SUMMARY OF THE INVENTION

An air flow system bypassing a balance or force transducer is used in a wind tunnel for testing a model airplane. The system is mounted inside the fuselage of the model airplane and may have either one or two air feed lines extending from the sting at the rear of the balance to a plenum chamber mounted at the front of the balance.

A key advantage of the invention is that there are no appreciable force interactions (actually only less than 1%) caused in the balance by the air flow in the bypass because no air flows through the balance, as in known prior art arrangements. Thus, there is no need for any corrections to the data taken during a test in order to cancel out such force interactions.

This advantage is obtained by using a plenum chamber in front of the balance with externally pressurized bellows which are located inside the plenum chamber. A plenum chamber may be defined as an enclosed space in which the pressure of the air contained therein is greater than the air pressure outside of the chamber. The external pressurization of the bellows is caused by air coming from at least one feed line which extends from the sting at the rear of the balance and bypasses the balance to connect with the plenum chamber at the front of the balance.

This and other advantages of the present invention will become more readily understood from an examination of the following brief description of the drawings and the subsequent detailed description of the two preferred embodiments.

BRIEF DESCRIPTION OF THE DRAWINGS

FIG. 3 is a top plan view of the air flow system of the present invention with the plenum chamber mounted in front of the force transducer.

FIG. 4 is a cross-sectional front elevational view of the plenum chamber used in the air flow system of the present invention.

DETAILED DESCRIPTION OF THE PREFERRED EMBODIMENTS

Figure 1:
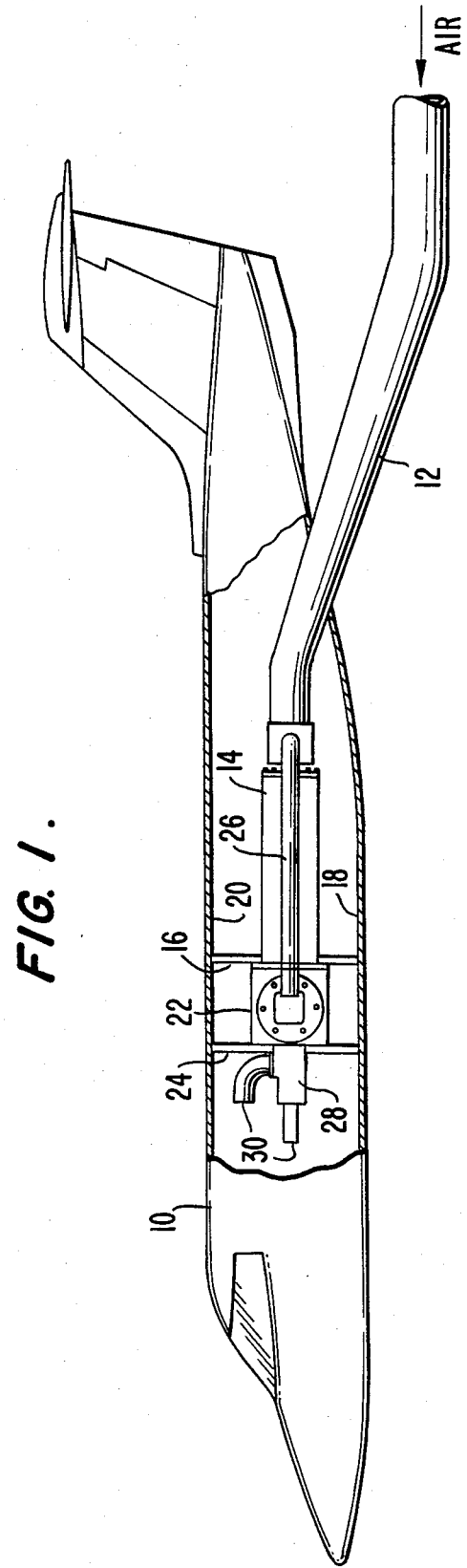
FIG. 1 is a partially broken away side elevational view of a force transducer of the present invention mounted inside a model airplane and projecting from the end of a sting mounted in a wind tunnel.

In FIG. 1 of the drawings, a model airplane 10 is shown mounted on a sting 12 of a wind tunnel. An airstream flows over the model airplane 10 from left to right in the wind tunnel so that the aerodynamic characteristics of the wings (not shown) on the model airplane 10 may be studied. An air flow system is incorporated inside the model airplane 10 so that a fuselage thereof is pressurized in order to simulate conditions inside a full-scale prototype.

A balance 14 is mounted on the forward end of the sting 12 inside the fuselage of the model airplane 10. The balance 14 is secured to a back side of a first bulkhead wall 16 which extends from a floor 18 to a ceiling 20 inside the fuselage of the model airplane 10. A plenum chamber 22 is mounted on a front side of the first bulkhead wall 16 and extends forwardly to a back side of a second bulkhead wall 24 so that the plenum chamber 22 is securely contained between the bulkhead walls 16 and 24 about midway between the floor 18 and the ceiling 20 inside the fuselage of the model airplane 10.

Air feed lines 26 bypass air flow from the sting 12 around the balance 14 to the plenum chamber 22 between the bulkhead walls 16 and 24 so that force interactions caused in prior art devices by the air flow through the balance 14 are avoided. The air flowing into the sting 12 comes from an external air source at a ground end of the air flow system outside the wind tunnel.

Motor-controlled valve assemblies 28 are mounted on a forward end of the plenum chamber 22 and extend through to a front side of the second bulkhead wall 24. Air exit lines 30 are connected to the valve assemblies 28 and feed air to a front portion of the fuselage of the model airplane 10 for simulating propulsion, blowing over the wing surfaces, and other purposes not relevant here to the present invention. Eventually, the air is returned to the sting 12 at the ground end of the air flow system.

Figure 2:
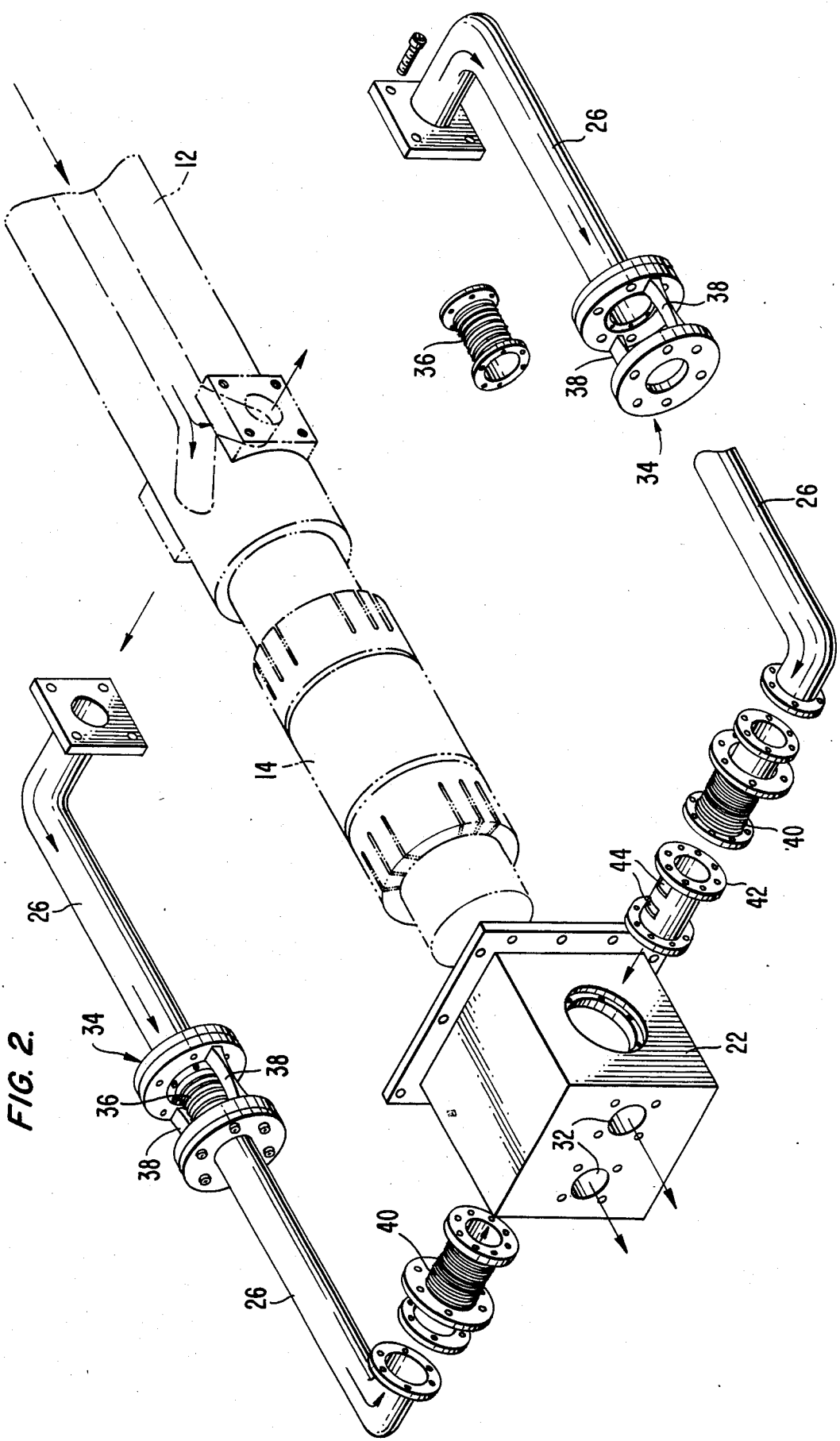
FIG. 2 is an exploded perspective view of the air flow system which bypasses air through two air feed lines around the force transducer to a plenum chamber mounted in front of such force transducer.

FIG. 2 shows the major components required in the first embodiment of the present invention for bridging over the balance 14 with high pressure or compressed air. From sting 12, air (designated by arrows) flows through the two air feed lines 26 to a plenum chamber 22 mounted at the live or matrix side of the balance 14. The air flows out of exit ports 32 but eventually returns back to the sting 12 by other lines (not shown). The sting 12, the air feed lines 26, the plenum chamber 22, the air exit lines 30 (FIG. 1), and the return lines (not shown) form a hard, continuous, closed loop for the air flow from the sting 12 to the plenum chamber 22 and back to the sting 12, thus causing the air flow to circumvent the balance 14.

Flexured bellow elements 34 are inserted in the air feed lines 26 and are characterized by flexible bellows 36 made of welded convolutions. The flexured bellow elements 34 are further characterized by metal flexures 38 with thin central pitch portions. These flexured bellow elements 34 absorb torsion on the air feed lines 26, thus preventing torsion, an undesirable force component, from acting on the balance 14.

A matched pair of bellow assemblies 40 are arranged at the end of each air feed line 26 and are housed inside the plenum chamber 22. The internal housing of the bellow assemblies 40 may be better understood by examining the top plan view shown in FIG. 3 and the cross-sectional front elevational view shown in FIG. 4. These bellows assemblies 40 are attached to the interior wall of the plenum chamber 22.

The operation of the invention will now be described. When the air flow system is turned on, air is introduced from the feed lines 26 into the plenum chamber 22. The air flow passes through the bellow assemblies 40 into a central fitting 42 which has exits 44. As best seen in FIGS. 3 and 4 by the air flow arrows designated therein, the air leaves central fitting 42 through the exits 44 and enters the interior of the plenum chamber 22. While inside the plenum chamber 22, the air pressurizes the bellow assemblies 40 externally. As seen in FIG. 3, the air leaves the plenum chamber 22 through the ports 32 leading directly to the valve assemblies 28. From the valve assemblies 28, the air enters exit lines 30.

From the immediately foregoing description, it may be realized by viewing FIGS. 1 and 4 together that, although the bellow assemblies 40 are externally pressurized by the air in the plenum chamber 22, the internal cavities 46 of the bellow assemblies 40 remain at the static pressure existing inside the fuselage of the model airplane 10 because such internal cavity 46 communicates with the fuselage through openings 48 in the side walls of the plenum chamber 22. The static pressure existing in the fuselage of the model airplane 10 may be, depending upon the test being conducted, the same as the static pressure existing outside of the model airplane in the wind tunnel. Under certain circumstances and for particular tests, such static pressure in the wind tunnel may be the same as atmospheric pressure.

The bellow assemblies 40 are infinitely stable when pressurized externally by the air inside the plenum chamber 22. This condition of infinite stability is much more highly desirable than a condition of occasional instability which occurs in all known prior art devices which are internally pressurized. Furthermore, such bellow assemblies 40, when externally pressurized, are usually much stiffer than when internally pressurized. This greater stiffness for externally pressurized bellow assemblies 40 is due to the lesser amount of change in the surface area of the bellow assemblies 40 when misalignment from end to end occurs inside the plenum chamber 22 than the amount of surface area change which takes place in internally pressurized bellow assemblies.

Figure 5:
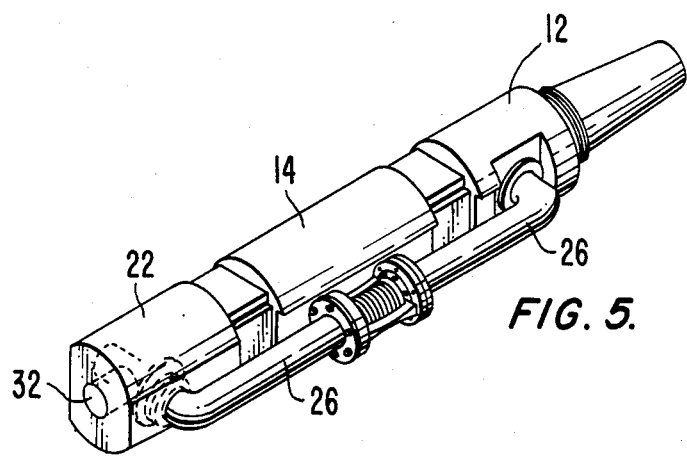
FIG. 5 is a perspective view of an alternative embodiment of the air flow system using only one air feed line to bypass air around the force transducer to the plenum chamber mounted in front of such force transducer.

In FIG. 5, there is shown an alternative embodiment of the present invention in which only one air feed line 26 extends from the sting 12, bypassing the balance 14, to the plenum chamber 22. Instead of having a plurality of exit ports 32 in the plenum chamber 22 of the first embodiment, there is only one such exit port 32 in the center of the front wall of the plenum chamber 22 in this second embodiment.

The negligible force interactions and the lack of shifts in the balance 14 of both embodiments due to torsion caused by moments acting on the air feed lines 26 is, in addition to the fact that no air flows through the balance 14, also a result of a low spring rating for the flexured bellows 34. A low spring rating means that the flexured bellows 34 are relatively stiff but are still flexible enough to absorb torsion or pitch which would otherwise be transferred from the air feed lines 26 to the balance 14. Spring ratings for the bellows 36 used in each flexured bellow 34 are matched within 0.25% of each other so that a bellow 36 in one air feed line 26 does not flex or otherwise turn more than another bellow 36 in a parallel air feed line 26. Thus, unequal transfer of torsion to the balance 14 is also avoided in the event that any torsion is ever, in fact, so transferred to the balance 14.

To relieve pitch or torsional winding up of the bellows 36 when deflection of the air feed lines 26 does occur, the metal flexures 38 installed in each flexured bellow 34 allow the air feed line 26 to flex in response to any force exerted prependicularly or otherwise normally to the entire air feed line 26. Such metal flexure 38 is basically a unidirectional hinge. Thus, any torsional winding up or twisting by an undesirable force applied to the sting 12, the air feed lines 26, and/or the balance 14 are transferred to and relieved through such metal flexures 38 operating in cooperation with the bellows 36.

The motor-controlled valve assemblies 28, shown only schematically in FIGS. 1 and 3, manage the air flow to be used internally in the fuselage of the model airplane 10 by valving such air flow, as desired by the operators of the wind tunnel, to various pneumatic subsystems (not shown). These subsystems may control engine simulations, surface blowing, and other functions required for operating the model airplane 10.

The foregoing two preferred embodiments are considered illustrative only. Numerous other modifications will readily occur to those persons skilled in aeronautical technology. Consequently, the disclosed invention is not limited by the exact construction and operation shown and described above but rather is defined by the claims appended hereto.

I claim:

1. A model airplane having a fuselage for testing inside a wind tunnel, comprising:
   a sting;
   an air source, connected to the sting, for feeding air through the sting;
   a balance for measuring forces acting on the model airplane, said balance being mounted on the sting;
   a plenum chamber for receiving air therein, said plenum chamber being mounted inside the fuselage in communication with the balance; and
   at least one air feed line extending from the sting to the plenum chamber and bypassing the balance;
   whereby negligible force interactions from air flowing in the sting, the at least one air feed line, and the plenum chamber are transferred to the balance for measuring forces.

2. The model airplane according to claim 1, further comprising:
   a flexured bellow element arranged in the at least one air feed line.

3. The model airplane according to claim 2, wherein:
   said flexured bellow element includes at least one flexure and at least one bellow.

4. The model airplane according to claim 1, further comprising:
   a bellow assembly mounted inside the plenum chamber and connected at one end to the at least one air feed line.

5. The model airplane according to claim 4, wherein:
   said bellow assembly is externally pressurized by air in the plenum chamber and has an internal cavity at a static pressure existing inside the fuselage.

6. The model airplane according to claim 1, wherein:
   said at least one air feed line includes two air feed lines entering the plenum chamber from opposite sides.

7. The model airplane according to claim 6, further comprising:
   a matched pair of bellow assemblies mounted inside the plenum chamber, each of said matched pair of bellow assemblies being connected at one end of one of the two air feed lines entering the plenum chamber from opposite sides.

8. The model airplane according to claim 7, further comprising:
   a central fitting arranged in the plenum chamber and connecting opposite ends of each of the matched pair of bellow assemblies to each other.

9. The model airplane according to claim 8, further comprising:
   means, arranged on the central fitting, for externally pressurizing the matched pair of bellow assemblies.

10. The model airplane according to claim 1, further comprising:
    port means, arranged in the plenum chamber, for allowing a flow of air to exit from the plenum chamber.

11. The model airplane according to claim 10, further comprising:
    valve means, connected to the port means, for managing the flow of air exiting from the plenum chamber.

12. A model airplane having a fuselage for testing inside a wind tunnel and being adapted to be mounted to a sting with an air source connected thereto for feeding air therethrough, said model airplane comprising:
    a balance for measuring forces acting on the model airplane, said balance being mounted on the sting;
    a plenum chamber for receiving air therein, said plenum chamber being mounted inside the fuselage in communication with the balance; and
    at least one air feed line extending from the sting to the plenum chamber and bypassing the balance;
    whereby negligible force interactions from air flowing in the sting, the at least one air feed line, and the plenum chamber are transferred to the balance.

13. The model airplane according to claim 12, further comprising:
    a flexured bellow element arranged in the at least one air feed line.

14. The model airplane according to claim 13, wherein:
    said flexured bellow element includes at least one flexure and at least one bellow.

15. The model airplane according to claim 12, further comprising:
    a bellow assembly mounted inside the plenum chamber and connected at one end to the at least one air feed line.

16. The model airplane according to claim 15, wherein:
    said hollow assembly is externally pressurized by air in the plenum chamber and has an internal cavity at a static pressure existing inside the fuselage.

17. The model airplane according to claim 12, wherein:
    said at least one air feed line includes two air feed line entering the plenum chamber from opposite sides.

18. The model airplane according to claim 17, further comprising:

a matched pair of bellow assemblies mounted inside the plenum chamber, each of said matched pair of bellow assemblies being connected at one end of one of the two air feed lines entering the plenum chamber from opposite sides.

19. The model airplane according to claim 18, further comprising:
a central fitting arranged in the plenum chamber and connecting opposite ends of each of the matched pair of bellow assemblies to each other.

20. The model airplane according to claim 19, further comprising:
means, arranged on the central fitting, for externally pressurizing the matched pair of bellow assemblies.

* * * * *

UNITED STATES PATENT OFFICE
CERTIFICATE OF CORRECTION

Patent No. 4,663,967    Dated   May 12, 1987

Inventor(s)  C. Harry Parkinson

It is certified that error appears in the above-identified patent and that said Letters Patent are hereby corrected as shown below:

Abstract, line 17, "below" should be --bellow--;

Column 5, line 10, "perpendicularly" is misspelled;

Claim 5, line 2 "bellow" is misspelled; and

Claim 17, line 3, "line" (second occurrence) should be --lines--.

Signed and Sealed this

Thirteenth Day of September, 1988

Attest:

DONALD J. QUIGG

Attesting Officer     Commissioner of Patents and Trademarks